May 16, 1933.  R. STATZ  1,909,023

TRANSMISSION JACK

Filed June 22, 1931  2 Sheets-Sheet 1

Inventor
Robert Statz
By Barnett & Truman
Attorneys.

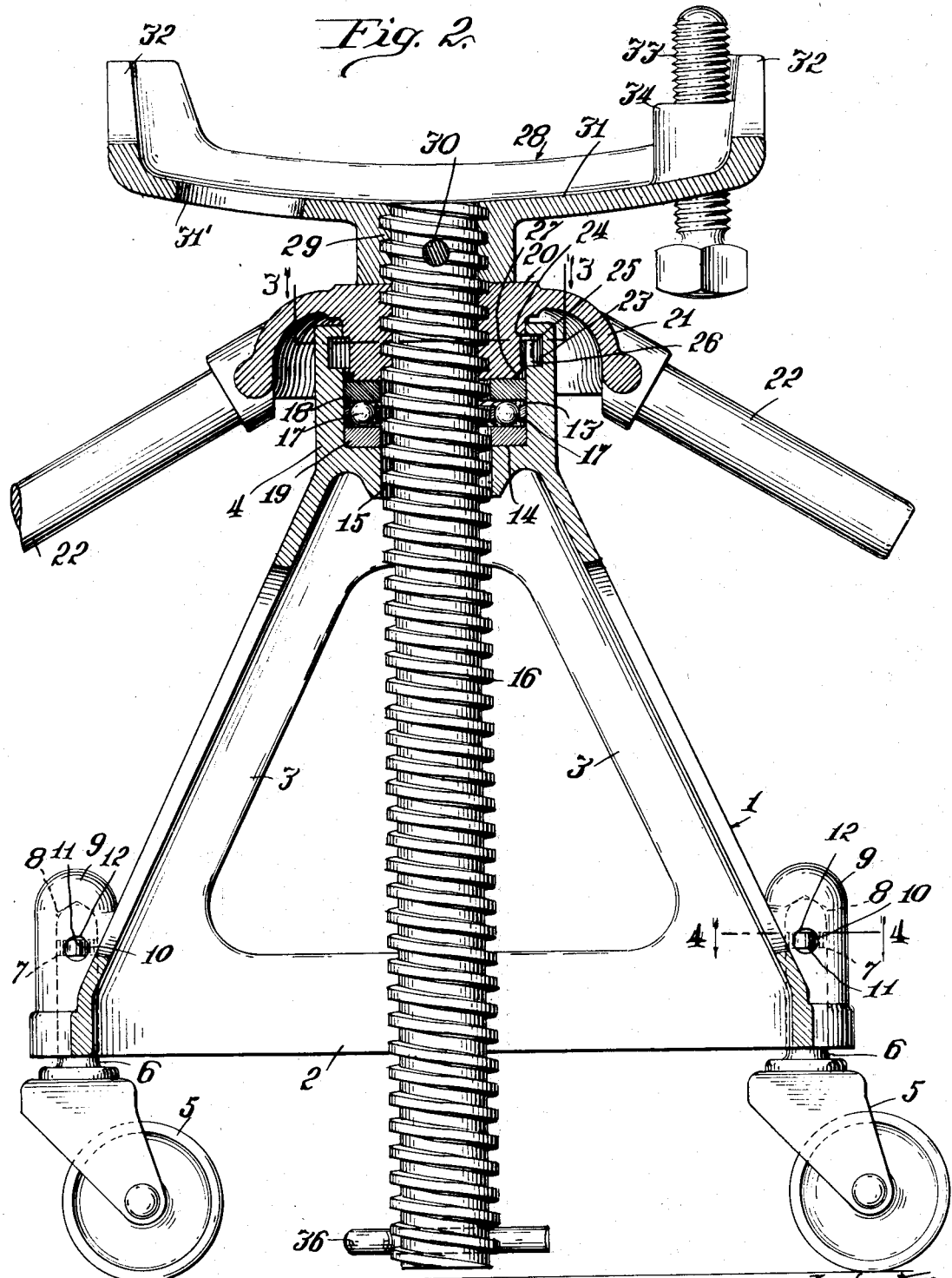

Patented May 16, 1933

1,909,023

UNITED STATES PATENT OFFICE

ROBERT STATZ, OF RACINE, WISCONSIN, ASSIGNOR TO WALKER MANUFACTURING COMPANY, OF RACINE, WISCONSIN, A CORPORATION OF WISCONSIN

TRANSMISSION JACK

Application filed June 22, 1931. Serial No. 546,053.

This invention relates to certain new and useful improvements in a transmission jack, and more particularly to an improved lifting jack especially designed to elevate, support and transport certain portions of an automobile, more especially the transmission and clutch assembly while this assembly or parts thereof are being repaired, removed or replaced.

It is the customary practice in removing a transmission or clutch assembly for the mechanic to lie beneath the car, perhaps on a "scooter" or "creeper" which is pushed beneath the car, and while in this position the bolts which hold the bell-shaped housing in position are removed. While the last bolts are being removed, this assembly which is of considerable weight must be supported by the mechanic and subsequently lowered and removed manually from beneath the car, this process usually necessitating the help of an assistant.

According to the present invention a special form of jack is used, said jack being of compact design so as to occupy a practical minimum of space beneath the car and at the same time have a sufficiently extensive supporting base to carry the transmission assembly without tilting. The jack is supported on casters so that it may be readily moved into the desired position, and may be easily moved out from beneath the car with the transmission assembly supported thereon. The jack is provided with a specially designed supporting head or cradle adapted to be adjustably conformed to the curved or irregular contour of the lower portion of the transmission assembly so that this load may be securely supported by the jack.

The general object of this invention is to provide an improved transmission jack of the type briefly described hereinabove and disclosed more in detail in the specifications which follow.

Another object is to provide an improved form of load-supporting head or cradle for carrying the transmission assembly.

Another object is to provide an improved form of supporting carriage for the jack.

Another object is to provide improved means for locking the casters in position.

Another object is to provide improved means for locking the rotatable nut within the carriage.

Other objects and advantages of this invention will be more apparent from the following detailed description of one approved form of apparatus constructed according to the principles of this invention.

In the accompanying drawings:

Fig. 2 is a central vertical section through the jack.

Figure 1:
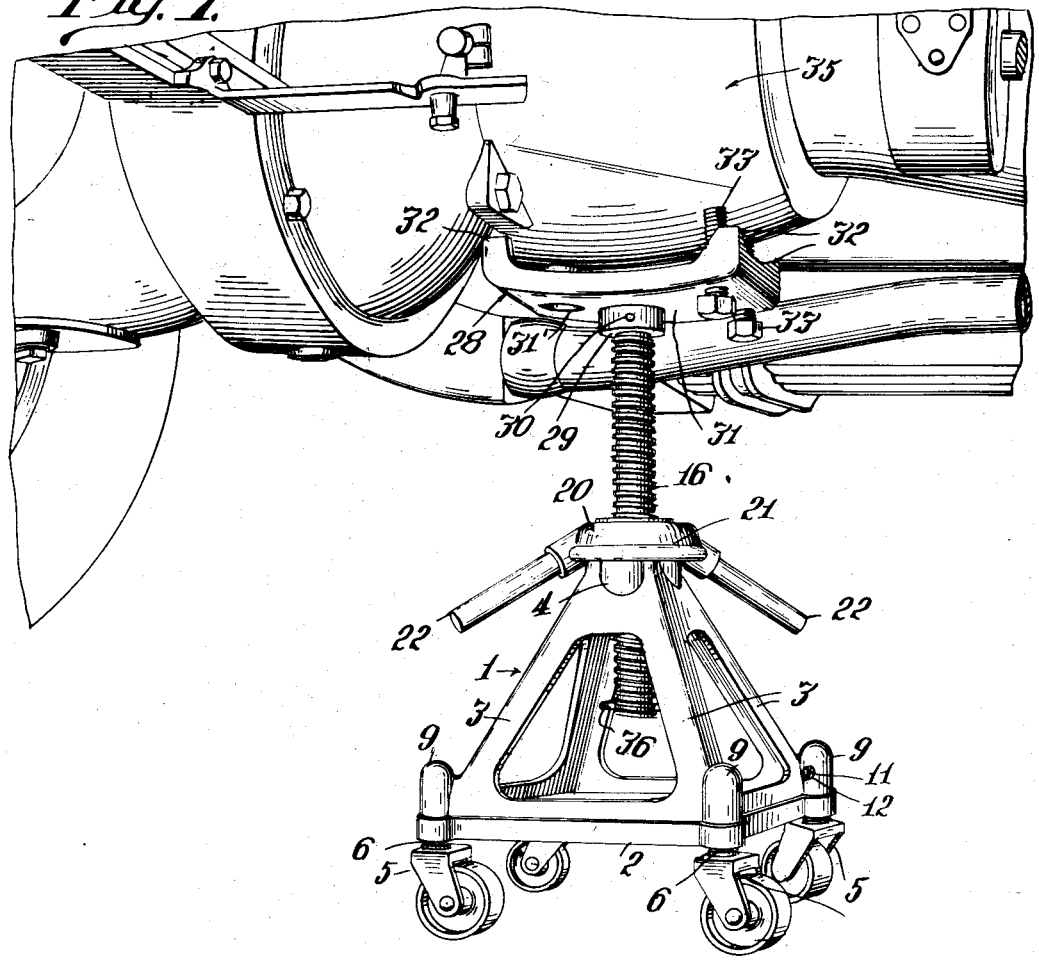
Fig. 1 is a perspective view showing the jack in operative position beneath the automobile.

The supporting frame of the carriage is formed as a single integral casting 1 of generally pyramidal shape, in the example here shown the base of the pyramid being rectangular and formed of a plurality of connected side bars 2. From the corners of the base, the bar members 3 converge upwardly and inwardly to the block or housing 4 which forms the apex of the pyramid.

The frame 1 of the carriage is supported on casters 5 of usual construction, there being one caster positioned adjacent each corner of the base of the pyramid. Each caster comprises an upwardly extending cylindrical shank 6 having an annular groove 7 formed in its outer surface at a location intermediate the ends of the shank. The shank 6 fits rotatably within a vertical cylindrical socket 8 in a boss or projection 9 formed integrally at each corner of the base of the pyramid. A split annular leaf spring 10 having an outwardly projecting finger 11 at one end thereof is mounted within the annular groove 7 in the shank 6. This spring, including the finger 11, may be compressed entirely into the groove 7 so that the shank may be pushed upwardly into the socket 8 until the finger 11 snaps out into a hole or opening 12 extending laterally through one side of boss 9 into the socket 8. The caster 5 is now locked in position, although the shank 6 is free to rotate about its vertical axis. The caster may easily be removed by inserting any suitable sharp instrument within the opening 12 so as to push the finger 11 back into the groove 7, after which the shank 6 may be withdrawn from socket 8.

A vertically positioned cylindrical recess 13, is formed in the head 4 at the apex of pyramidal casting 1, this recess extending through the upper end of the head, but being partially closed at its lower end to form an annular supporting shoulder 14 which surrounds the smaller cylindrical opening 15, through which the lifting screw 16 extends freely. A suitable anti-friction bearing is supported on the shoulder 14 within recess 13. As here shown, this bearing comprises a cage 16 supporting the annular series of balls 17 confined between the upper and lower race-rings 18 and 19.

The nut 20 has a lower cylindrical portion adapted to fit within the upper portion of recess 13 and rests upon the upper race-ring 18. The upper end of nut 20 is formed with an outwardly and downwardly projecting skirt portion 21, from which a pair of operating handles 22 extend outwardly and downwardly at diametrically opposite points. The lifting screw 16 is threaded within nut 20, and it will be apparent that when this nut 20 is rotated in one direction or the other by means of handles 22, the screw 16 (if held from rotation by engagement with a load) will be raised or lowered.

Figure 3:
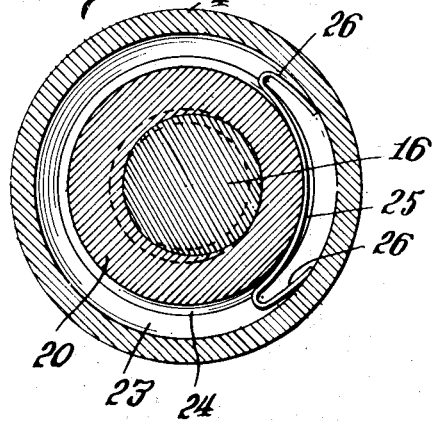
Fig. 3 is a horizontal section taken substantially on the line 3—3 of Fig. 2.
Figure 4:
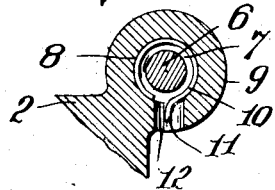
Fig. 4 is a horizontal section taken substantially on the line 4—4 of Fig. 2.

An annular groove 23 is formed in the inner cylindrical wall of recess 13, and a mating annular groove 24 is formed in the outer cylindrical surface of nut 20. The locking spring 25 which is seated within the mating grooves may take a variety of forms. As shown, for example, in Fig. 3, the arcuate leaf spring 25 has return-bent end portions 26 which spring outwardly but may be compressed against the main arcuate portion of the spring. This spring may be seated within groove 23, and then compressed into this groove while the nut is pushed into position within the upper portion of recess 13. The spring 25 will then snap out into groove 25 and lock the nut in place. It will be apparent that this locking spring will not interfere with the rotary movement of the nut, but will prevent the nut from being lifted out of recess 13. The lower edge of nut 20 may be beveled inwardly, as indicated at 27, to permit the nut to be pushed down into position, thus compressing the spring 25 into the groove 23. The spring 25 also acts as a slight drag on nut 20 to prevent undesired free rotation thereof.

The improved load supporting head or cradle 28 is supported in any suitable manner at the upper end of screw 16. As here shown the screw 16 is threaded into the supporting member at 29 and locked in place by means of cross pin 30. The head or cradle 28 preferably has a laterally extending body portion 31 of generally rectangular form and is upwardly dished so as to conform somewhat to the curved or rounded surface of the transmission housing. An opening 31' may be provided to receive the drain plug of the transmission case, or other downwardly projecting parts.

Adjacent its four corners the head is provided with upwardly projecting supporting fingers 32 adapted to engage the transmission housing at spaced points and permit the intermediate curved surface of the housing to be received between these upwardly projecting fingers. Preferably a pair of vertically adjustable screws 33 are threaded in bosses 34 adjacent the corners at one end of the body portion 31, that is, adjacent two of the supporting fingers 32. By adjusting these screws 33 up or down, it will be apparent that the cradle 28 may be adapted to engage almost any desired portion of the lower surface of the transmission housing, or other suitable load, at four spaced points, so that the load will be securely supported on and carried by the jack. The screws 32 may be auxiliary to the fingers 32 at one end of the carriage or may re-place these fingers. It will also be apparent that a single adjusting screw 33 might be used in connection with a pair of spaced fingers 32 at the opposite end of the cradle so as to form a three-point support, or adjustable screws 33 might be positioned at three or more corners of the cradle.

It will now be apparent that this improved jack is quite compact and sturdy, and is very simple in operation. Before the last bolts or other supporting devices are removed, the jack is pushed into position beneath the transmission housing, (or other similar load). The cradle 28 is moved up into position beneath the housing by rotating the handles 22, and if necessary the cradle is adjusted to fit the irregular lower surface of the housing by suitably adjusting one or more of the screws 33. As indicated in Fig. 1, the jack has been thus positioned beneath an automobile and has been adjusted into position to support the transmission assembly indicated generally at 35. When the last bolts have been removed and the load is entirely supported by the jack, the jack can usually be lowered sufficiently to permit the load to be drawn out from beneath the automobile body while still resting on the jack. The transmission assembly may be replaced by simply reversing these operations.

It will be noted from Fig. 2 that when the jack is in completely lowered position the lower end of screw 16 extends down almost to the supporting surface on which the casters 5 rest, thus permitting the use of a maximum length of screw and giving a maximum lift to the jack when this screw is elevated. A cotter pin 36 or other stop member secured in the lower end of screw 16 contacts with the lower surface of the head 4 of frame 1 to limit the upward extension of the jack.

It will be apparent that this jack is of very compact construction so as to interfere as little as possible with the operations of the worker beneath the car, while at the same time the supporting base 2 and the load-supporting head or cradle 28 are of sufficient lateral extent to present a firm foundation for the load and prevent any danger of tilting or falling over while supporting the load or while being moved into or out of place beneath the car. The handles 22, do not extend laterally substantially beyond the outlines of the structure as defined by the area of the base 2. Since the sides of the supporting frame or carriage converge upwardly in generally pyramidal form, ample room is provided within the space defined by the vertical projection of the base and below the load-supporting cradle when completely lowered, for the outwardly and downwardly projecting operating handles 22. Thus the handles may be easily manipulated, in any position of the jack, without adding to the space required for the jack by reason of the laterally extending carriage base and load-supporting head.

It will be apparent that the base of the supporting frame need not be square or rectangular but can be circular or of any other desired outline so long as adequate lateral support is provided. The term "pyramidal" as applied to the carriage frame is intended to cover any of these alternative forms.

I claim:

1. An automobile transmission jack comprising a carriage, rotary means for movably supporting the carriage, elevating means mounted on the carriage and comprising an elevating screw, a nut in which the screw is threaded, and means for causing relative rotation between the screw and nut whereby the screw is moved vertically, a load-supporting cradle carried by the upper end portion of the screw, said cradle having a laterally extending body portion of generally rectangular contour, formed with a pair of upwardly extending load-supporting fingers at the two corners at one end thereof, and a pair of vertically adjustable load-supporting screws mounted in the two corners at the other end of the body.

2. In an automobile transmission jack comprising a movable carriage and elevating means mounted thereon, a load supporting cradle comprising a laterally extending body portion of generally rectangular contour, and upwardly projecting fingers adjacent the four corners of the body for engaging the downwardly curved lower surface of the load at spaced points, and a pair of vertically adjustable screws mounted in the cradle adjacent two of the fingers.

3. An automobile transmission jack comprising a carriage of generally pyramidal form, spaced apart means mounted adjacent the several corners of the base of the pyramid for movably supporting the carriage, there being a cylindrical recess formed in the apex of the pyramid, an annular anti-friction bearing mounted in the bottom of this recess, a nut having a downwardly projecting hub mounted in the recess and supported on the bearing, the nut having a skirt portion projecting outwardly and downwardly over the apex of the carriage operating handles extending from the skirt, an elevating screw threaded in the nut, a load-supporting member at the upper end of the screw, there being mating annular grooves formed in the outer surface of the hub and the inner wall of the recess, and a compressible spring member confined within the mating grooves to lock the nut in place while permitting it to rotate with relation to the carriage.

4. An automobile transmission jack comprising a carriage of generally pyramidal form having a broad supporting base and sides converging upward to a central apex, means for rotatably supporting the base, a nut, means for rotatably supporting the nut at the apex of the carriage, a vertically positioned lifting screw threaded in the nut, a laterally extending load-supporting cradle mounted at the upper end of the screw, said cradle comprising a laterally extending portion provided with a plurality of spaced apart load-engaging fingers, certain of the fingers being in the form of vertical adjustable screws, and operating handles extending outwardly and downwardly from the nut between the base and cradle.

5. An automobile transmission jack comprising a carriage of generally pyramidal form substantially symmetrical about a central vertical axis and having a broad supporting base and sides converging upward to a central apex, means for rotatably supporting the base adjacent its outer edge portions, there being a cylindrical recess formed in the apex of the carriage, a nut having a downwardly projecting hub rotatably supported in the recess and an outwardly and downwardly projecting skirt portion overlapping the apex, a vetrically extending lifting screw threaded in the nut, a laterally extending load-supporting cradle mounted at the upper end of the screw and provided with means engaging the load at a plurality of laterally spaced points, and operating handles extending outwardly and downwardly from the skirt between the base and cradle.

ROBERT STATZ.